United States Patent [19]

Arfaei et al.

[11] Patent Number: 5,703,174

[45] Date of Patent: Dec. 30, 1997

[54] AIR CONTROLLING SUPERPLASTICIZERS

[75] Inventors: Ahmad Arfaei, Chelmsford; James F. Lambert, Chestnut Hill, both of Mass.

[73] Assignee: W. R. Grace & Co.-Conn., New York, N.Y.

[21] Appl. No.: 493,036

[22] Filed: Jun. 21, 1995

[51] Int. Cl.$^6$ .................. C08F 8/32; C08F 8/14
[52] U.S. Cl. .................. 525/329.9; 525/330.1; 525/379; 525/380; 525/384; 525/385
[58] Field of Search ............. 525/329.9, 330.1, 525/380, 384, 379, 385

[56] References Cited

U.S. PATENT DOCUMENTS

| | | |
|---|---|---|
| 3,817,949 | 6/1974 | Ribba . |
| 4,065,607 | 12/1977 | Kurowsky .................. 526/15 |
| 4,223,120 | 9/1980 | Kurowsky .................. 526/208 |
| 4,229,224 | 10/1980 | Dawson et al. .................. 106/90 |
| 4,338,239 | 7/1982 | Dammann .................. 524/549 |
| 4,471,100 | 9/1984 | Tsubakimoto et al. .................. 525/367 |
| 4,500,693 | 2/1985 | Takehara et al. .................. 526/240 |
| 4,524,163 | 6/1985 | Bradley et al. .................. 524/5 |
| 4,586,960 | 5/1986 | Iizuka et al. .................. 106/90 |
| 4,589,995 | 5/1986 | Fukumoto et al. .................. 252/180 |
| 4,656,217 | 4/1987 | Sugiura et al. .................. 524/430 |
| 4,745,159 | 5/1988 | Anzai et al. .................. 525/329.9 |
| 4,800,220 | 1/1989 | Ribba .................. 526/238.23 |
| 4,814,014 | 3/1989 | Arfaei .................. 106/90 |
| 4,814,462 | 3/1989 | Kurata et al. .................. 548/444 |
| 4,892,586 | 1/1990 | Watanabe et al. .................. 106/92 |
| 4,946,506 | 8/1990 | Arfaei et al. .................. 106/724 |
| 4,946,904 | 8/1990 | Akimoto et al. .................. 525/327.8 |
| 4,946,918 | 8/1990 | Akiyama et al. .................. 526/271 |
| 4,948,429 | 8/1990 | Arfaei .................. 106/659 |
| 4,960,465 | 10/1990 | Arfaei .................. 106/724 |
| 4,968,755 | 11/1990 | Canova et al. .................. 525/330.4 |
| 4,977,227 | 12/1990 | Negami et al. .................. 527/400 |
| 5,028,271 | 7/1991 | Huddleston et al. .................. 106/720 |
| 5,085,708 | 2/1992 | Moriya et al. .................. 106/819 |
| 5,086,142 | 2/1992 | Fock et al. .................. 526/318 |
| 5,098,628 | 3/1992 | Okamoto et al. .................. 264/256 |
| 5,137,945 | 8/1992 | Tsubakimoto et al. .................. 524/5 |
| 5,142,036 | 8/1992 | Akimoto et al. .................. 536/18.3 |
| 5,156,679 | 10/1992 | Gartner et al. .................. 106/808 |
| 5,162,402 | 11/1992 | Ogawa et al. .................. 524/5 |
| 5,176,753 | 1/1993 | Brook .................. 106/819 |
| 5,237,017 | 8/1993 | Akiyama et al. .................. 525/366 |
| 5,369,198 | 11/1994 | Albrecht et la. .................. 526/240 |
| 5,393,343 | 2/1995 | Darwin et al. .................. 106/808 |

FOREIGN PATENT DOCUMENTS

| | | |
|---|---|---|
| 2125521 | 12/1994 | Canada . |
| 238404 | 9/1987 | European Pat. Off. . |
| 57-57706 | 4/1982 | Japan . |
| 59-83968 | 11/1982 | Japan . |
| 58-74552 | 5/1983 | Japan . |
| 58-147413 | 9/1983 | Japan . |
| 59-176312 | 10/1984 | Japan . |
| 62-68806 | 3/1987 | Japan . |
| 62-78137 | 4/1987 | Japan . |
| 175253 | 11/1990 | Japan . |
| 175254 | 11/1990 | Japan . |
| 1167524 | 10/1969 | United Kingdom . |

*Primary Examiner*—Fred Zitomer
*Attorney, Agent, or Firm*—Craig K. Leon; William L. Baker

[57] ABSTRACT

Polymeric additives for hydraulic cement compositions which impart to the wet cement composition greater plasticity, lower slumploss over time, and water reduction capability without the problems of air entrainment associated with prior polymeric additives of this type. The superplasticizers have a carbon backbone formed by polymerization of ethylenically-unsaturated carboxylic acids, the backbone comprising carboxylic acid grafting sites to which are covalently attached a) air detraining functional side chains, which are first polyoxyalkylene groups of the general formula $$R^4-(OA^2)_x-Q-$$

wherein $Q=O$ or $NH$;

$A^2=C_1-C_{10}$ alkylene;

$x=1$ to 200; and $R^4=C_1-C_{10}$ alkyl, and b) second polyoxyalkylene groups of the general formula $R^5-O-(A^3O)_y-(A^3)_p-N=$, wherein $A^3=C_1-C_{10}$ alkylene; $y=1$ to 200; $p=1$ to 50; and $R^5=C_1-C_{10}$ alkyl.

50 Claims, 3 Drawing Sheets

AIR CONTROLLING SUPERPLASTICIZERS

FIELD OF THE INVENTION

This invention relates to hydraulic cement admixtures, particularly to certain polymeric additives for hydraulic cement compositions which impart to the wet cement composition greater plasticity, lower slumploss over time, and water reduction capability without the problems of air entrainment associated with prior polymeric additives of this type.

BACKGROUND OF THE INVENTION

Various types of organic compounds have been used to advantageously alter certain properties of wet hydraulic cement compositions. One class of compounds, which can collectively be called "superplasticizers", fluidify or plasticize the wet cement composition to obtain a more fluid composition at a given water to cement ratio. A controlled fluidity is desired, such that the aggregate used in mortars and concretes does not segregate from the cement paste. Alternatively, superplasticizers may allow the cement composition to be prepared using a lower water to cement ratio, in order to obtain a composition having a desired consistency (often leading to a hardened cement composition having a greater compressive strength after setting.)

A good superplasticizer should not only fluidify the wet cement composition to which it is added, but maintain that level of fluidity over a desired period of time. This time should be long enough to keep the wet cement composition fluid, for example, in a ready-mix truck while it is on its way to a job site, while the truck is idling at the job site, and while the cement composition is being worked into the desired final form. However, the cement mixture cannot remain fluid for too long, i.e., the set must not be greatly retarded, because this will hold up work on the job. Commonly known types of superplasticizers include: melamine sulfonate-formaldehyde condensates, napthalenesulfonate-formaldehyde condensates, lignosulfonates, polysaccharides, hydroxycarboxylic acids and their salts, and carbohydrates.

One of the problems associated with the addition of superplasticizers is their often adverse affect on the quality and quantity of entrained air in the mix. Some air is inevitable and imparts beneficial properties to structural concrete, e.g., freeze-thaw stability of the hardened cement mass; improved workability of the wet cement composition; and mitigation of bleeding. In fact, the proper use of air entrainers in cement compositions results in these benefits. However, too much and/or uncontrolled or poor quality air is detrimental to concrete and mortar. This problem is particularly acute with polyoxyalkylene-based polymer superplasticizers, e.g., U.S. Pat. Nos. 4,814,014 or 4,946,904. The use of defoamers or air detrainers in conjunction with such superplasticizers has been tried, but these efforts have been largely unsuccessful for several reasons. First, this practice increases the cost and complexity of making the cement composition. Second, admixtures combining superplasticizers and air detrainers can be made, but are not stable over long periods, i.e., the two components are not very miscible and phase separation eventually occurs. Some modifications to these so-called "two component" admixtures have been proposed, e.g., Great Britain patent publication 2 280 180 A, disclosing solutions of polymer in which a defoamer is dissolved in the polymer or "stably dispersed" therein in particulate form (i.e., a two-phase system.) However, systems like the aforementioned are still two-phase systems having the potential for phase separation and short shelf life. Third, previous attempts at solving the aforementioned problem of entrained air have met with mixed results at best. A particular difficulty is adding the correct air detrainer in the correct amount; if too much is added, air cannot be re-entrained. It has also been near impossible to not only predict how much air detrainer to add for a given concentration of superplasticizer to obtain a desired level of air, but to ensure that such a prediction holds for a variety of cements.

SUMMARY OF THE INVENTION

The present invention relates to a cement admixture comprising air controlling polymer superplasticizers having a carbon backbone formed by polymerization of ethylenically-unsaturated carboxylic acids, wherein said backbone comprises carboxylic acid grafting sites to which are covalently attached a) air detraining functional side chains, wherein said air detraining functional side chains are first polyoxyalkylene as groups of the general formula wherein Q=O or NH;

$A^2 = C_1 - C_{10}$ alkylene;

x=1 to 200; and $R^4 = C_1 - C_{10}$ alkyl, and b) second polyoxyalkylene groups of the general formula $R^5-O-(A^3O)_y-(A^3)_p-N=$, wherein $A^3=C_1-C_{10}$ alkylene; y=1 to 200; p=1 to 50; and $R^5=C_1-C_{10}$ alkyl.

Air controlling polymer superplasticizers of the invention further include those having the formula wherein each $R^1$ independently represents a hydrogen atom or a $C_1-C_5$ alkyl group; A represents a mixture of Z and $R^2$; Z represents hydrogen atom, monovalent or divalent metal cation, ammonium group or organic amine group; $R^2$ represents an air detraining polyoxyalkylene group represented by $(BO)_n$ $R^3$ in which O represents an oxygen atom, B represents a $C_1-C_{10}$ alkylene group, $R^3$ represents a $C_1-C_{10}$ alkyl group and n represents an integer of from 1–200, or mixtures thereof; $R^6$ represents a polyoxyalkylene group represented by $(BO)_n$ $R^3$; and a, b, c and d are numerical values representing molar percentage of the polymer's structure such that a is a value of about 1 to 99; the sum of c+d is a value of from 0 to the numerical value of (100−a); and b is a remainder value of [100−(a+c+d)].

DETAILED DESCRIPTION OF THE INVENTION

As used herein, the term "superplasticizer" refers to a class of compounds which are capable of functioning as water-reducing admixtures or superplasticizers, depending on the compound and the amount of it added to a cement composition. "Water-reducing admixture" and "superplasticizer" are terms of art which reference the relative water-reducing ability of a material. Water-reducing admixtures provide a water reduction capability of 5% to 12% (ASTM C-494 Type A or Type D), while superplasticizers provide water reduction in excess of 12% (ASTM C494 Type F or Type G.) Superplasticizers also produce flowing concrete according to ASTM C-1017. For brevity and convenience the copolymers of this invention are referred to herein simply as superplasticizers. This term includes polymers which function as water reducing admixtures or superplasticizers, as defined above.

The term "cement composition" as used herein refers to pastes, mortars, grouts such as oil well cementing grouts, and concrete compositions comprising a hydraulic cement binder. The terms "paste", "mortar" and "concrete" are terms of art; pastes are mixtures composed of a hydraulic cement binder (usually, but not exclusively, Portland cement, and may also include fly ash, blast furnace slag, and silica fume or other materials commonly included in such cements) and water; mortars are pastes additionally including fine aggregate, and concretes are mortars additionally including coarse aggregate. The cement compositions of this invention are formed by mixing required amounts of certain materials, e.g., a hydraulic cement, water, and fine or coarse aggregate, as may be applicable to make the particular cement composition being formed.

We have discovered that polymers as described herein are very effective as superplasticizers when admixed into hydraulic cement compositions. Hydraulic cement slurries containing the superplasticizers of this invention also exhibit a low slumploss over time. Moreover, introduction of the polymers into cement compositions as superplasticizers does not result in the often unstable or uncontrollable air entrainment associated with many superplasticizers, particularly those of the type described hereinabove.

Air controlling polymer superplasticizers of the invention have a carbon backbone formed by polymerization of ethylenically-unsaturated carboxylic acids, wherein said backbone comprises carboxylic acid grafting sites to which are covalently attached a) air detraining functional side chains. The carbon backbone may optionally contain intervening atoms like oxygen (i.e., ether linkage). The grafting sites are the point of covalent attachment of the air detraining functional side chains. We find it preferable that the air detraining functional side chains be grafted onto the polycarboxylic acid backbone in making air controlling polymer superplasticizers of the invention; however, "grafting" per se is not necessary, but other suitable means of ensuring attachment of the air detraining functional side chains to the backbone may be used. Suitable grafting sites include free carboxylic acid (or salt thereof) groups. Carbon backbones may be made by polymerization of ethylenically-unsaturated monomers, preferably ethylenically-unsaturated carboxylic acids (e.g., allyl carboxylic acids) such as acrylic, methacrylic, maleic, fumaric, citraconic, itaconic, (meth)allylsulfonic, vinyl sulfonic, sulfoethyl(meth)acrylic, 2-(meth)acrylamido 2-methylpropane sulfonic, mesaconic, or dicarboxylic acid half-esters. Preferred polycarboxylic acid carbon backbones are, e.g., polyacrylic or polymethacrylic acid. 5-to 200-mers are preferred, more preferably 5- to 150-mers, and 5- to 100-reefs particularly preferred. Preferably about 5% or more of the carboxylic acid groups on the polycarboxylic acid backbone remain unesterified, more preferably about 10% or more.

The air detraining functional side chains are chemical groups which function to stabilize entrained air quality and level, and are covalently attached to the grafting sites of the carbon backbone. In general, incorporation of the air detraining functional side chains in the air controlling polymer superplasticizers of the invention, has been found to produce cement compositions having measured air (ASTM test method C-231 Type B Meter) of ≦about 3.5%, preferably ≦3%, more preferably ≦2.0%. The side chains are advantageously polyoxyalkylene groups of the general formula wherein Q=O or NH;

$A^2=C_1-C_{10}$ alkylene;

x=1 to 200; and $R^4=C_1-C_{10}$ alkyl.

The term alkyl(ene) is meant herein to encompass linear or branched alkyl(ene) groups, and also include (where structurally possible) aryl(ene) and arylalkyl(ene) groups. In preferred air detraining functional side chains, $A^2=C_2-C_5$ alkylene; more preferably, the $OA^2$ groups are a mixture of ethylene oxide ("EO") and propylene oxide ("PO"). Air detraining performance appears to be particularly good when the weight ratio of EO/PO in the air detraining functional side chain is from about 3: 1 to 0.3: 1, more preferably from about 1.5: 1 to 0.6: 1. Q is preferably O, and x is preferably 1 to 100. $R^4$ is advantageously butyl, preferably a n-butyl group. We have found a range of polyoxyalkylene alcohols available from Huntsman Chemical Corporation (Houston, Tex.) under the tradename JEFFOX to function well when incorporated as air detraining functional side chains in air controlling polymer superplasticizers of the invention, e.g., JEFFOX WL5000 and WL660. These polyoxyalkylene alcohols have number average molecular weights of about 3500 and 1850, respectively, and have the formula $(C_4H_9)(OA^2)_xOH$, where $OA^2$ is a mixture of EO and PO, and the EO/PO weight ratio is ≈1:1.

Certain polyoxyalkylene amines are also grafted onto/ attached to the carbon backbone, i.e., having the general formula wherein Q=O or NH;

$A^2=C_1-C_{10}$ alkylene;

x=1 to 200; and

$R^4=C_1-C_{10}$ alkyl.

Such polyoxyalkylene amines may be grafted or attached to the carbon backbone by an amide and/or imide linkage, in which case the attached group would have the formula $R^5-O-(A^3O)_y-(A^3)_p-N=$ (note that the ,=, sign is meant to signify two covalent bonds to other atoms, for example, to two carbonyl carbons on the backbone, i.e., imide linkage, or to a hydrogen atom and a carbonyl carbon on the backbone .) In preferred polyoxyalkylene amines, $A^3=C_2-C_5$ alkylene; more preferably, the $A^3O$ groups are a mixture of EO and PO. An EO/PO weight ratio of about 7:1 to 0.5:1 has been found suitable. y is preferably in the range of 1 to 100. p is preferably in the range of 1 to 5, more preferably 1 to 2. $R^5$ is preferably methyl ($CH_3$—). For example, polyoxyalkylene amines available from Huntsman Chemical Corporation (Houston, Tex.) under the tradename JEFFAMINE have been found suitable in the invention, e.g., JEFFAMINE M1000 and M2070, having number average molecular weights corresponding to their respective product numbers. The JEFFAMINES have the formula $CH_3O(A^3O)_y$ $CH_2CH(CH_3)NH_2$, where $A^3O$ is a mixture of EO and PO.

The mole ratio of polyacrylic acid to a) polyoxyalkylene amine and b) polyoxyalkylene alcohol is generally about 2:1 to 9:1, and the weight ratio of a) to b) is generally about 20:1 to 2:1. It can easily be seen that by varying the amount of the polyoxyalkylene alcohol side chains grafted onto the backbone, superplasticizers can be made in accordance with the invention which will produce corresponding variance in entrained air. One preferred air controlling polymer superplasticizer of the invention comprises polyacrylic acid ("PAA") to which has been grafted a) polyoxyalkylene amines of the formula $CH_3O(A^3O)_yCH_2CH(CH_3)NH_2$, where $A^3O$ is a mixture of EO and PO and the EO/PO weight ratio is from about 5:1 to 0.5:1 and b) polyoxyalkylene alcohols of the formula $(C_4H_9)(OA^2)_xOH$, where $OA^2$ is a mixture of EO and PO and the EO/PO weight ratio is ≈1:1.

Air controlling polymer superplasticizers of the invention further include those having the formula wherein each $R^1$ independently represents a hydrogen atom or a $C_1-C_5$ alkyl group; A represents a mixture of Z and $R^2$; Z represents hydrogen atom, monovalent or divalent metal cation, ammonium group or organic amine group; $R^2$ represents an air detraining polyoxyalkylene group represented by $(BO)_n$ $R^3$ in which O represents an oxygen atom, B represents a $C_1-C_{10}$ alkylene group, $R^3$ represents a $C_1-C_{10}$ alkyl group and n represents an integer of from 1-200, or mixtures thereof; $R^6$ represents a polyoxyalkylene group represented by $(BO)_n$ $R^3$; and a, b, c and d are numerical values representing molar percentage of the polymer's structure such that a is a value of about 1 to 99; the sum of c+d is a value of 0 to the numerical value of (100–a); and b is a remainder value of [100–(a+c+d)].

a is preferably from about 30 to 99, more preferably from 50 to 99. In the $R^2$ group, B preferably represents a $C_2-C_5$ alkylene group, $R^3$ represents a $C_1-C_4$ alkyl group, and n represents an integer of from 1–100. More preferably, the BO groups are a mixture of EO and PO. Air detraining performance appears to be particularly good when the weight ratio of EO/PO is from about 3:1 to 0.3:1, more preferably from about 1.5:1 to 0.6:1. $R^4$ is advantageously butyl, preferably a n-butyl group.

$R^6$ represents a polyoxyalkylene group represented by $(BO)_n$ $R^3$, and is advantageously $R^5$—O—$(A^3O)_y$—$(A^3)_p$—, wherein $A^3=C_1-C_{10}$ alkylene; y=1 to 200; p=1 to 50; and $R^5=C_1-C_{10}$ alkyl. Preferably, $A^3=C_2-C_5$ alkylene; more preferably, the $A^3O$ groups are a mixture of EO and PO. An EO/PO weight ratio of about 7:1 to 0.5:1 has been found suitable. y is preferably in the range of 1 to 100. p is preferably in the range of 1 to 5, more preferably 1 to 2. $R^5$ is preferably methyl ($CH_3$—). In a particularly preferred embodiment, a) $R^6$ is of the formula $CH_3O(A^3O)_yCH_2CH(CH_3)$—, where $A^3O$ is a mixture of EO and PO, and the EO/PO weight ratio is from about 5:1 to 0.5:1, and b) $R^2$ is of the $(C_4H_9)(OA^2)_xO$—, where $OA^2$ is a mixture of EO and PO and the EO/PO weight ratio is ≈1:1.

The air controlling polymer superplasticizer may be made by grafting a polyoxyalkylene amine onto a polycarboxylic acid backbone (amidization/imidization reaction), then grafting onto the polycarboxylic acid backbone an air detraining polyoxyalkylene alcohol (esterification reaction). The reactions are carried out in an oxygen-free atmosphere, in a reaction vessel having a condenser for facilitating water removal, e.g., a jacketed-coiled condenser fitted with a Dean-Stark trap. (During the course of the reactions, water (a reaction by-product) is removed to drive the reaction to completion.) In the amidization/imidization step, the reactants which are contacted with each other and heated to 100° C. to about 185° C. for about 1 to 8 hours, preferably about 1.5 to 2.5 hours, or until the amidization/imidization is complete. (Reference is made to U.S. Pat. No. 5,393,343, the entire disclosure of which is incorporated herein by reference for further details of the reaction.) For the esterification reaction, a catalyst is added to catalyze the esterification of the polyoxyalkylene alcohol to the graft polymer. Any agent which will catalyze ester formation may be used (i.e., dehydrating agents, defined herein as those which facilitate the formation of water in chemical reactions; such as naphthalene sulfonic acid, carbodiimide, or p-toluene sulfonic acid), with p-toluene sulfonic acid preferred. The temperature is maintained at 100° C. to about 185° C. for about 1 to 8 hours, preferably about 1.5 to 2.5 hours, or until the esterification is complete. Water by-product is removed as above. The reaction vessel is cooled, the reaction product is neutralized and the total solids of the mixture are adjusted with solvent if desired or necessary for addition to a cement composition in a desired dosage. Other methods of preparation may be used as long as the resultant polymer has the characteristics described herein. For example, certain polyoxyalkylene superplasticizers of the type obtained by polymerization of ethylenically-polymerizable carboxylic acids and ethylenically-polymerizable polyoxyalkylenes, as exemplified by U.S. Pat. Nos. 4,471,100 and 4,946,904, the entire disclosures of which are incorporated herein by reference, comprise a carbon backbone and grafting sites (carboxylic acid groups). It is intended that air detraining functional side chains as described herein may be esterified to the free carboxylic acid groups of these polyoxyalkylene superplasticizers to impart the benefits detailed herein. Such resulting air-controlling polymer superplasticizers are intended to be within the scope of our invention.

The air controlling polymer superplasticizer-treated cement composition can be formed at any stage of the cement's formation or use. For example, the polymer can be mixed at the cement mill with clinker cement raw material during its grinding to form cement powder. It can also be applied to the cement powder during its blending with other dry materials to prepare a specific type of cement, such as blended cement, pozzolanic cement and the like. Alternately, the improved cement can be formed in situ during the course of preparing a cement composition such as a mortar mix or a concrete. The air controlling polymer superplasticizer can be added conventionally as a aqueous solution as part of the water of hydration, or can be added separately. In the latter method of application, the water of the aqueous polymer solution should be calculated as part of the total water content of the cement composition.

The amount of air controlling polymer superplasticizer admixed into hydraulic cement compositions, whether as a dry blend of cement and polymer or as formed in situ as part of the formation of a wet unset cement composition, should be an effective amount to either allow reduction of the water content while retaining equivalent slump of a blank composition, or increase the slump while maintaining the water to cement ratio, whichever is desired. The specific amount of this superplasticizer admixture for either purpose can be readily determined and will depend on the cement composition, the ratio of components of the composition, and the degree of fluidity desired. Generally the amount will be at least 0.005 weight percent, and usually in the range of 0.005 to 5, preferably 0.03 to 1.0 weight percent, based on the weight of hydraulic cement binder in the composition. A more preferred amount, similarly based, is about 0.05 to 0.3 weight percent.

Cement compositions formed with the invention have controlled, stable air content and a significantly higher degree of flowability (higher degree of slump), than compositions formed with conventional hydraulic cement, and are capable of retaining their high degree of slump over a sustained period of time allowing cement technicians an extended period to work the cement composition into its final shape. As stated above, this beneficial combination of properties has not been attainable with a polymer superplasticizer of this type until now. Cement compositions made in accordance with the invention also achieve initial set without exhibiting excessive retardation. Thus, the use of this cement composition does not cause delay of the working time required to form a particular structure.

Conventional cement additives, such as air entrainers, water proofing agents, strength enhancers, corrosion inhibitors, and curing accelerators can be used with the subject cement additive. These additives can be mixed with the cement composition prior to, along with or subsequent to the addition of the present cement additive. A benefit of the polymer superplasticizers of the invention is that, for a given dosage of superplasticizer, air content and stability is consistent over a range of cement types, thus allowing for the addition of air entrainers to impart a predictable level of air.

The following examples are given for illustrative purposes only and are not meant to be a limitation on the claims appended hereto. All parts and percentages are by weight unless otherwise indicated.

Polymer superplasticizers in accordance with the invention were made according to the following procedure. Polycarboxylic acid (MW≈5000), polyoxyalkylene alcohol, and polyoxyalkylene amine were combined in a reaction vessel equipped with a $N_2$ sweep, mechanical stirrer and a jacketed-coiled condenser fitted with a Dean-Stark trap. The polyoxyalkylene amine was grafted onto the polycarboxylic acid backbone at 140° C. to 185° C. for two hours. p-toluene sulfonic acid was added as an esterification catalyst, and the reaction mixture was heated for an additional two hours, to allow for the esterification of the polyoxyalkylene alcohol onto the polycarboxylic acid backbone. Upon cooling to ≈50° C., the reaction product was neutralized with 40% (wt/wt) aqueous NaOH and total solids adjusted to 40% with deionized water. A comparative superplasticizer having no air &training functional side chain incorporated therein ("Comparative #1") was made according to Example 1 of U.S. Pat. No. 5,393,343. The makeup of the polymer superplasticizers made as above appears in Table 1.

TABLE 1

| Admixture | PAA/ polyoxyalkylene compounds (mole ratio) | Polyoxyalkylene amine/ polyoxyalkylene glycol (weight ratio) |
|---|---|---|
| Invention #1† | 3.5:1 | 90:10 |
| Invention #2† | 3.5:1 | 80:20 |
| Invention #3† | 3.5:1 | 90:10 |
| Invention #4† | 3.5:1 | 90:10 |

† polyoxyalkylene amine: JEFFAMINE M2070
polyoxyalkylene alcohol: JEFFOX WL5000

All concrete testing was conducted as follows. The mixer interior was wet with water, which was allowed to drain out by inverting the mixer drum. The drum was righted and 28 kg coarse aggregate and 24 kg fine aggregate were added to the drum and mixed briefly (about 20 seconds) before adding half of the mix water (calculated to provide a w/c ratio of 0.5) and mixing for another 20 seconds. The remainder of the mix water was added, holding 75–100ml in reserve for rinsing the container holding the superplasticizer admixture. Air entrainer (if desired) was added at this point and mixed for approximately another minute. 11 kg Portland cement was added and after another minute for mixing, superplasticizer admixture (and defoamer if desired) was added, with the reserve water used for rinsing the container. Slump and slumploss were measured in accordance with ASTM C-143, and % air was measured in accordance with ASTM C-231 Type B Meter. Defoamer was PLURONIC 25R2 and the dosage was 0.0025% s/s (admixture solids based on the total cement solids in the concrete). Air entrainer was DARAVAIR 1000 (Grace Construction Products). Superplasticizer was dosed at 0.12% s/s.

EXAMPLE 1

Figure 1:
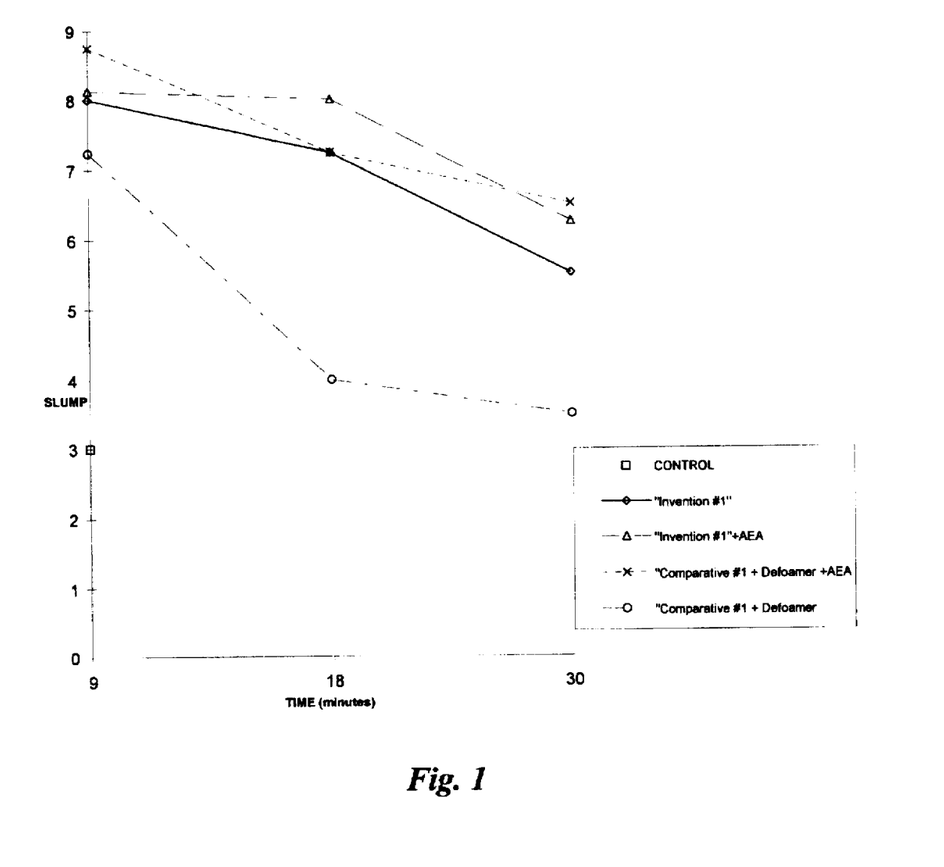

Table II, the results of which are shown graphically in FIG. 1, demonstrate slump and slumploss performance of the superplasticizers of the invention that are comparable to Comparative #1. This demonstrates that one may use the inventive superplasticizers in conjunction with air entrainers, if desired, without sacrificing slump performance.

TABLE II

| | Slump (in.) | | |
|---|---|---|---|
| | 9 min | 18 min | 30 min |
| BLANK | 3.0 | | |
| "Invention #1" | 8 | 7.25 | 5.5 |
| "Invention #1" + AEA (0.5 oz./cwt) | 8.13 | 8 | 6.25 |
| "Comparative #1" + Defoamer + AEA (1.0 oz./cwt) | 8.75 | 7.25 | 6.5 |
| "Comparative #1" + Defoamer | 7.25 | 4 | 3.5 |

EXAMPLE 2

Figure 2:
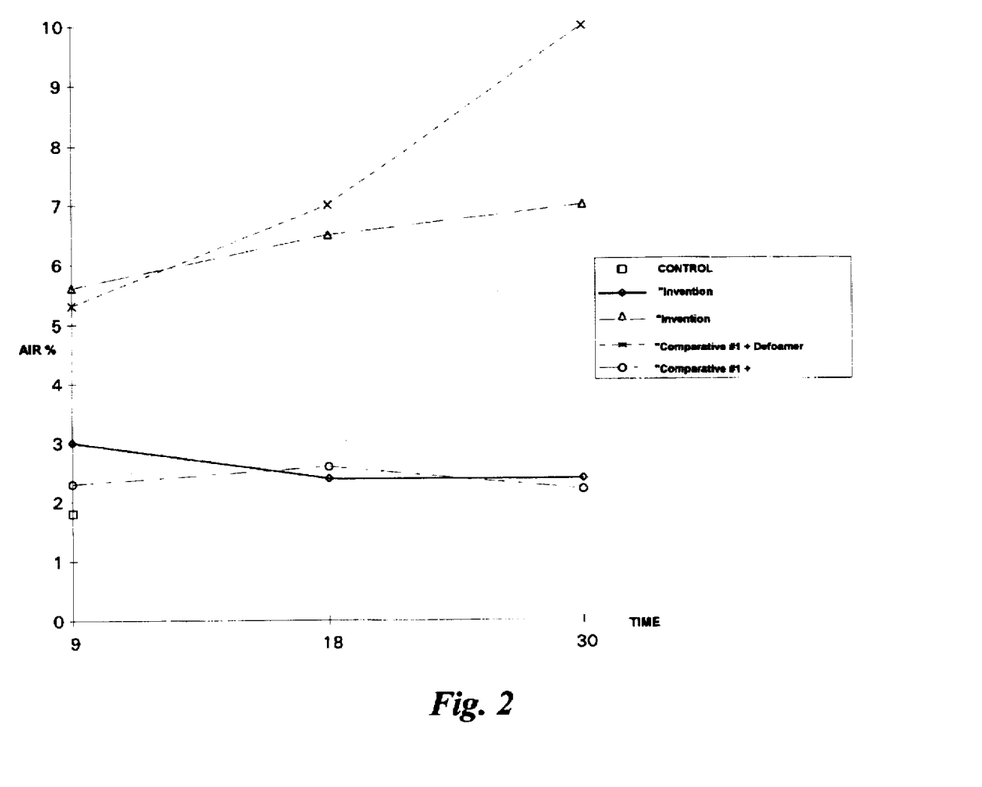

Table III, the results of which are shown graphically in FIG. 2, demonstrate that the superplasticizers of the invention entrain low and stable air in a manner comparable to Comparative #1 with air detrainer. However, when used in conjunction with air entrainer, air level over time is clearly more stable with the invention over that of Comparative #1.

TABLE III

|  | Air (%) | | |
| --- | --- | --- | --- |
|  | 9 min | 18 min | 30 min |
| BLANK | 1.8 | | |
| "Invention #1" | 3.0 | 2.4 | 2.4 |
| "Invention #1" + AEA (0.5 oz./cwt) | 5.6 | 6.5 | 7.0 |
| "Comparative #1" + Defoamer + AEA (1.0 oz./cwt) | 5.3 | 7.0 | 10.0 |
| "Comparative #1" + Defoamer | 2.3 | 2.6 | 2.2 |

EXAMPLE 3

Figure 3:
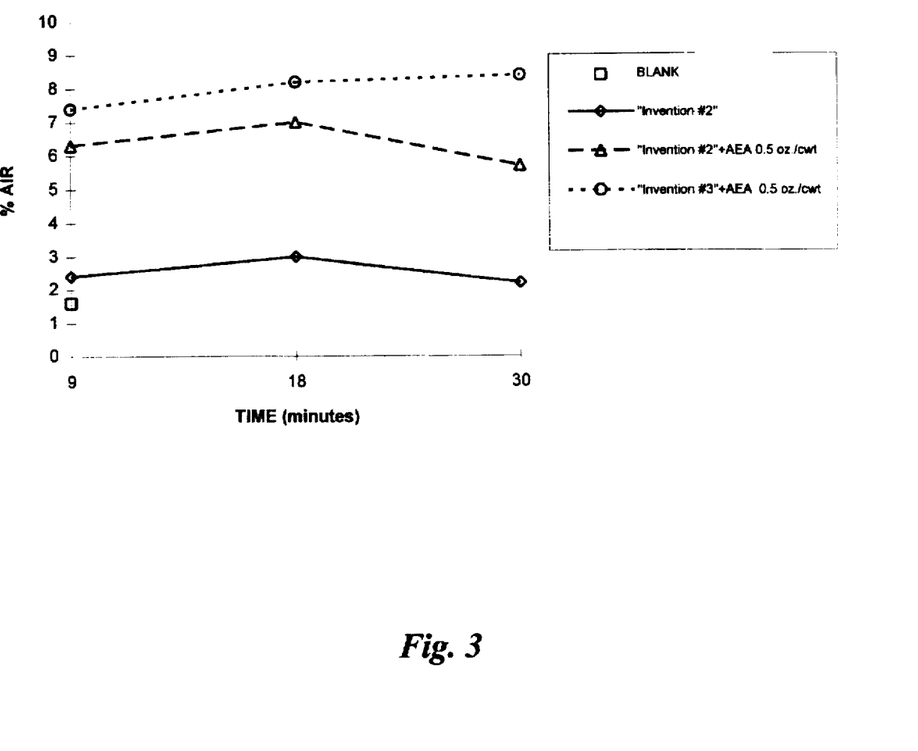

Table IV, the results of which are shown graphically in FIG. 3, demonstrates how the superplasticizers of the invention may be made with different proportions of air detraining functional side chains to produce an air controlling superplasticizer which imparts different levels of air.

TABLE IV

|  | AIR (%) | | |
| --- | --- | --- | --- |
|  | 9 min | 18 min | 30 min |
| BLANK | 1.6 | | |
| "Invention #2" | 2.4 | 3 | 2.2 |
| "Invention #2" + AEA 0.5 oz./cwt | 6.3 | 7 | 5.7 |
| "Invention #3" + AEA 0.5 oz./cwt | 7.4 | 8.2 | 8.4 |

What is claimed is:

1. An air controlling polymeric superplasticizer having a carbon backbone formed by polymerization of ethylenically-unsaturated carboxylic acids, wherein said backbone comprises carboxylic acid grafting sites to which are covalently attached a) air detraining functional side chains, wherein said air detraining functional side chains are first polyoxyalkylene groups of the general formula $R^4-(OA^2)_x-Q-$ wherein
   $OA^2$ is a mixture of EO and PO groups wherein the weight ratio of EO to PO groups is from 3:1 to 0.3:1;
   Q=O or NH;
   $A^2=C_1-C_{10}$ alkylene;
   x=1 to 200; and
   $R^4=C_1-C_{10}$ alkyl, and b) second polyoxyalkylene groups of the general formula
   $R^5-O-(A^3O)_y-(A^3)_p-N=$, wherein $A^3=C_1-C_{10}$ alkylene; y=1 to 200; p=1 to 50; and $R^5=C_1-C_{10}$ alkyl.

2. The air controlling polymeric superplasticizer of claim 1 wherein said ethylenically-unsaturated carboxylic acids are selected from the group consisting of acrylic, methacrylic, maleic, fumaric, citraconic, itaconic, (meth) allylsulfonic, vinyl sulfonic, sulfo ethyl (meth) acrylic, 2-(meth) acrylamido 2-methylpropane sulfonic, mesaconic, or dicarboxylic acid half-esters.

3. The air controlling polymeric superplasticizer of claim 1 wherein said carbon backbone is polyacrylic acid.

4. The air controlling polymeric superplasticizer of claim 1 wherein the weight ratio of EO to PO groups is from 1.5:1 to 0.6:1.

5. The air controlling polymeric superplasticizer of claim 1 wherein the weight ratio of EO to PO groups is ≈1:1.

6. The air controlling polymeric superplasticizer of claim 1 wherein $A^2=C_{2-C5}$ alkylene; x=1 to 100; and $R^4=C_1-C_4$ alkyl.

7. The air controlling polymeric superplasticizer of claim I wherein $A^3=C_2-C_5$ alkylene; y=1 to 100; p=1 to 5; and $R^5$=methyl.

8. The air controlling polymeric superplasticizer of claim 1 wherein $A^3$ is a mixture of EO and PO.

9. The air controlling polymeric superplasticizer of claim 3 wherein a) said air detraining functional side chain is of the general formula $(C_4H_9)(OA^2)_xO-$, where $OA^2$ is a mixture of EO and PO and the EO/PO weight ratio is ≈1:1, and b) said second polyoxyalkylene groups are of the general formula $CH_3O(A^3O)_yCH_2CH(CH_3)N=$, where $A^3O$ is a mixture of EO and PO and the EO/PO weight ratio is from about 5:1 to 0.5:1, and where the molar ratio of polyacrylic acid to a) and b) is from 2:1 to 9:1, and the weight ratio of a) to b) is from 20:1 to 2:1.

10. An air controlling polymeric superplasticizer made by the process of providing a polycarboxylic acid backbone;

grafting a polyoxyalkylene amine onto said polycarboxylic acid backbone via an amidization/imidization reaction; and grafting a polyoxyalkylene alcohol onto said polycarboxylic acid backbone via an esterification reaction.

11. An air controlling polymeric superplasticizer having the structural formula wherein each $R^1$ independently represents a hydrogen atom or a $C_1$–$C_5$ alkyl group; A represents a mixture of Z and $R^2$; Z represents hydrogen atom, monovalent or divalent metal cation, ammonium group or organic amine group; $R^2$ represents an air detraining polyoxyalkylene group represented by $(BO)_n R^3$ in which O represents an oxygen atom, B represents a $C_1$–$C_{10}$ alkylene group, $R^3$ represents a $C_1$–$C_{10}$ alkyl group and n represents an integer of from 1–200, or mixtures thereof; $R^6$ represents a polyoxyalkylene group represented by $(BO)_n R^3$; and a, b, c and d are numerical values representing molar percentage of the polymer's structure such that a is a value of about 1 to 99; the sum of c+d is a value of from 0 to the numerical value of (100–a); and b is a remainder value of [100–(a +c+d)].

12. The air controlling polymeric superplasticizer of claim 11 wherein $R^2$ represents an air detraining polyoxyalkylene group represented by $(BO)_n R^3$ in which O represents an oxygen atom, B represents a $C_2$–$C_5$ alkylene group, $R^3$ represents a $C_1$–$C_4$ alkyl group, and n represents an integer of from 1–100.

13. The air controlling polymeric superplasticizer of claim 11 wherein a is a value of about 30 to 99.

14. The air controlling polymeric superplasticizer of claim 11 wherein a is a value of about 50 to 99.

15. The air controlling polymeric superplasticizer of claim 11 wherein $R^3$=$C_1$–$C_4$ alkyl.

16. The air controlling polymeric superplasticizer of claim 11 wherein BO is a mixture of EO and PO groups.

17. The air controlling polymeric superplasticizer of claim 16 wherein the weight ratio of EO to PO groups is from 3:1 to 0.3:1.

18. The air controlling polymeric superplasticizer of claim 16 wherein the the weight ratio of EO to PO groups is from 1.5:1 to 0.6:1.

19. The air controlling polymeric superplasticizer of claim 16 wherein the the weight ratio of EO to PO groups is ≈1:1.

20. The air controlling polymeric superplasticizer of claim 16 wherein $R^6$ is of the general formula $R^5$—O—$(A^3O)_y$—$(A^3)_p$—, wherein $A^3$=$C_1$–$C_{10}$ alkylene; y=1 to 200; p=1 to 50; and $R^5$=$C_1$–$C_{10}$ alkyl.

21. The air controlling polymeric superplasticizer of claim 20 wherein $A^3$=$C_2$–$C_5$ alkylene; y=1 to 100; p=1 to 5; and $R^5$=methyl.

22. The air controlling polymeric superplasticizer of claim 20 wherein $A^3$ is a mixture of EO and PO.

23. The air controlling polymeric superplasticizer of claim 20 wherein a) $R^6$ is of the formula $CH_3O(A^3O)_y CH_2CH(CH_3)$—, where $A^3O$ is a mixture of EO and PO and the EO/PO weight ratio is from about 5:1 to 0.5:1, and b) $R^2$ is of the formula $(C_4H_9)(OA^2)_xO$—, where $OA^2$ is a mixture of EO and PO, and the EO/PO weight ratio is ≈1:1.

24. An air controlling polymeric superplasticizer made by the process of combining a polycarboxylic acid backbone, a polyoxyalkylene amine, and a polyoxyalkylene alcohol to form a mixture thereof;

heating said mixture to from 100° C. to about 185° C. for about 1 to 8 hours;

adding a dehydrating agent to said mixture; and heating said mixture at 100° C. to about 185° C. for about 1 to 8 hours.

25. A cement composition comprising a hydraulic cement and an air controlling polymeric superplasticizer having a carbon backbone formed by polymerization of ethylenically-unsaturated carboxylic acids, wherein said backbone comprises carboxylic acid grafting sites to which are covalently attached a) air detraining functional side chains, wherein said air detraining functional side chains are first polyoxyalkylene groups of the general formula wherein
$OA^2$ is a mixture of EO and PO groups wherein the weight ratio of EO to PO groups is from 3:1 to 0.3:1;
Q=O or NH;
$A^2$=$C_1$–$C_{10}$ alkylene;
x=1 to 200; and
$R^4$=$C_1$–$C_{10}$ alkyl, and b) second polyoxyalkylene groups of the general formula $R^5$—O—$(A^3O)_y$—$(A^3)_p$—N=, wherein $A^3$=$C_1$–$C_{10}$ alkylene; y=1 to 200; p=1 to 50; and $R^5$=$C_1$–$C_{10}$ alkyl.

26. The cement composition of claim 25 wherein said ethylenically-unsaturated carboxylic acids are selected from the group consisting of acrylic, methacrylic, maleic, fumaric, citraconic, itaconic, (meth) allylsulfonic, vinyl sulfonic, sulfo ethyl (meth) acrylic, 2-(meth) acrylamido 2-methylpropane sulfonic, mesaconic, or dicarboxylic acid half-esters.

27. The cement composition of claim 25 wherein said carbon backbone is polyacrylic acid.

28. The cement composition of claim 27 wherein the weight ratio of BO to PO groups is from 1.5:1 to 0.6:1.

29. The cement composition of claim 27 wherein the weight ratio of EO to PO groups is ≈1:1.

30. The cement composition of claim 27 wherein $A^2$=$C_2$–$C_5$ alkylene; x=1 to 100; and $R^4$=$C_1$–$C_4$ alkyl.

31. The cement composition of claim 27 wherein $A^3$=$C_2$–$C_5$ alkylene; y =1 to 100; p=1 to 5; and $R^5$=methyl.

32. The cement composition of claim 31 wherein $A^3$ is a mixture of EO and PO.

33. A cement composition comprising hydraulic cement and the air controlling polymeric superplasticizer of claim 27 wherein a) said air detraining functional side chain is of the general formula $(C_4H_9)(OA^2)_xO$—, where $OA^2$ is a mixture of EO and PO and the EO/PO weight ratio is ≈1:1, and b) said second polyoxyalkylene groups are of the general formula $CH_3O(A^3O)_y CH_2CH(CH_3)N=$, where $A^3O$ is a mixture of EO and PO and the EO/PO weight ratio is from about 5:1 to 0.5:1, and where the molar ratio of polyacrylic acid to a) and b) is from 2:1 to 9:1, and the weight ratio of a) to b) is from 20:1 to 2:1.

34. An cement composition comprising hydraulic cement and an air controlling polymeric superplasticizer made by the process combining a polycarboxylic acid backbone, a polyoxyalkylene amine, and a polyoxyalkylene alcohol to form a mixture thereof;

heating said mixture to from 100° C. to about 185° C. for about 1 to 8 hours;

adding a dehydrating agent to said mixture; and heating said mixture at 100° C. to about 185° C. for about 1 to 8 hours.

35. An cement composition comprising hydraulic cement and an air controlling polymeric superplasticizer having the structural formula wherein each $R^1$ independently represents a hydrogen atom or a $C_1$–$C_5$ alkyl group; A represents a mixture of Z and $R^2$; Z represents hydrogen atom, monovalent or divalent metal cation, ammonium group or organic amine group; $R^2$ represents an air detraining polyoxyalkylene group represented by $(BO)_n$ $R^3$ in which O represents an oxygen atom, B represents a $C_1$–$C_{10}$ alkylene group, $R^3$ represents a $C_1$–$C_{10}$ alkyl group and n represents an integer of from 1–200, or mixtures thereof; $R^6$ represents a polyoxyalkylene group represented by $(BO)_n$ $R^3$; and a, b, c and d are numerical values representing molar percentage of the polymer's structure such that a is a value of about 1 to 99; the sum of c+d is a value of from 0 to the numerical value of (100–a); and b is a remainder value of [100–(a+c+d)].

36. The cement composition of claim 35 wherein $R^2$ represents an air detraining polyoxyalkylene group represented by $(BO)_n$ $R^3$ in which O represents an oxygen atom, B represents a $C_2$–$C_5$ alkylene group, $R^3$ represents a $C_1$–$C_4$ alkyl group, and n represents an integer of from 1-100.

37. The cement composition of claim 35 wherein a is a value of about 30 to 99.

38. The cement composition of claim 35 wherein a is a value of about 50 to 99.

39. The cement composition of claim 35 wherein $R^3$=$C_1$–$C_4$ alkyl.

40. The cement composition of claim 35 wherein BO is a mixture of EO and PO groups.

41. The cement composition of claim 40 whereto the weight ratio of EO to PO groups . is from 3:1 to 0.3:1.

42. The cement composition of claim 40 wherein the weight ratio of EO to PO groups is from 1.5:1 to 0.6:1.

43. The cement composition of claim 40 wherein the weight ratio of EO to PO groups is ≈1:1.

44. The cement composition of claim 35 wherein $R^6$ is of the general formula $R^5$—O—$(A^3O)_y$—$(A^3)_p$—, wherein $A^3$=$C_1$–$C_{10}$ alkylene; y=1 to 200; p=1 to 50; and $R^5$=$C_1$–$C_{10}$ alkyl.

45. The cement composition of claim 35 wherein $A^3$=$C_2$–$C_5$ alkylene; y=1 to 100; p=1 to 5; and $R^5$=methyl.

46. The cement composition of claim 35 wherein $A^3$ is a mixture of EO and PO.

47. The cement composition of claim 35 wherein a) $R^6$ is of the formula $CH_3O(A^3O)_yCH_2CH(CH_3)$—, where $A^3O$ is a mixture of EO and PO and the EO/PO weight ratio is from about 5:1 to 0.5:1, and b) $R^2$ is of the formula $(C_4H_9)(OA^2)_x$O—, where $OA^2$ is a mixture of EO and PO, and the EO/PO weight ratio is ≈1:1.

48. The cement composition of claim 35 further comprising an air entraining component.

49. The cement composition of claim 35 further comprising a strength enhancer.

50. A method of making an air controlling hydraulic cement composition comprising the step of adding to a hydraulic cement mix the air controlling polymeric superplasticizer of claims 1, 3, 11, or 24, to form a hydraulic cement composition having an air level of 3.5%, as measured by ASTM 0231 Type B Meter.

* * * * *